US005459939A

United States Patent [19]
Kubo et al.

[11] Patent Number: 5,459,939
[45] Date of Patent: Oct. 24, 1995

[54] APPARATUS AND METHOD FOR MEASURING WIDTH OF MICRO GAP

[75] Inventors: Keishi Kubo, Moriguchi; Keiichi Yoshizumi, Osaka, both of Japan

[73] Assignee: Matsushita Electric Industrial Co., Ltd., Osaka, Japan

[21] Appl. No.: 179,709

[22] Filed: Jan. 11, 1994

[30] Foreign Application Priority Data

Jan. 12, 1993 [JP] Japan .................................. 5-003139

[51] Int. Cl.$^6$ ....................................................... G01B 5/02
[52] U.S. Cl. ........................... 33/542; 33/559; 33/701
[58] Field of Search ............................ 33/1 M, 503, 542, 33/556, 559, 701, 827, 813, 832, 833

[56] References Cited

U.S. PATENT DOCUMENTS

| | | | |
|---|---|---|---|
| 4,080,741 | 3/1978 | Siddall et al. | 33/542 |
| 4,087,918 | 5/1978 | Schmid et al. | 33/542 |
| 4,364,178 | 12/1982 | Huet | 33/503 |
| 5,083,384 | 1/1992 | Possati et al. | 33/542 |

*Primary Examiner*—William A. Cuchlinski, Jr.
*Assistant Examiner*—G. Bradley Bennett
*Attorney, Agent, or Firm*—Wenderoth, Lind & Ponack

[57] ABSTRACT

An apparatus and method for measuring a width of a micro gap of a non-conductive material of a sample which is formed between two conductive materials thereof, includes a conductive probe having a sharpened front end, a cantilever having the probe, a sample confronting the probe, a driving device for relatively moving the sample with respect to the probe in three directions of XYZ, and bias power source for applying a voltage between the probe and the sample, an electric current detecting device for detecting a contact current running between the probe and the sample, a micro displacement detecting part which detects an amount of deflection of the cantilever when the sample and the probe are in touch with each other, a servo part which feeds back the amount of the deflection of the cantilever detected by the micro displacement detecting part to the driving device thereby to control to change a position of the sample in the Z-direction of the probe so as to make the amount of the deflection of the cantilever constant, and a measuring device for scanning the probe on the sample in a widthwise direction of the gap of the sample by the driving device, and at the same time sampling outputs of the detecting device thereby to measure the width of the gap in the widthwise direction.

17 Claims, 7 Drawing Sheets

1

APPARATUS AND METHOD FOR MEASURING WIDTH OF MICRO GAP

BACKGROUND OF THE INVENTION

The present invention relates to an apparatus and method for measuring the width of a gap of a non-conductive material between conductive materials of a sample such as a magnetic head of a magnetic recording apparatus, and more particularly to an apparatus and method for measuring the width of a micro gap not larger than 0.2 µm which has been impossible to measure by an optical measuring apparatus hitherto.

The width of a gap of a magnetic head has been decreased more and more as the recording density of magnetic recording apparatus, for example, video disks, hard disks, etc. have been improved. This has been accompanied by an increased need to measure the reduced width of the gap in the development/inspection process of the magnetic head.

An example of a conventional method for measuring the width of the gap will be described hereinbelow with reference to FIG. 6.

FIG. 6 illustrates a conventional measuring method for measuring the gap width. In the drawing, reference numeral 101 represents a measuring sample; 102 an objective lens; 103 a body of a microscope; 104 a light source; 105 a CCD camera; 106 a computer; 107 an XYZ stage; and 108 a gap formed in the sample 101.

The operation for measuring the width of the gap in the conventional method will now be described.

The gap 108 illuminated by the light source 104 is magnified with the magnification not smaller than 1000 times by the CCD camera 105 via the objective lens 102 and the microscope body 103. The image magnified by the CCD camera 105 is processed by the computer 106, to thereby measure the width of the gap 108.

The width of a gap not larger than 0.2 µm has been measured conventionally in the following two methods.

FIG. 7 is a diagram of signals along the direction of the gap detected by the CCD camera 105. In an optical system using a xenon lamp of the wavelength λ=350 nm as a light source, even when an objective lens showing NA=0.9 is employed, the limit of the separable width is λ/(2*NA)=350 nm/(2*0.9)=194 nm. As is apparent from FIG. 7, the signal indicative of the gap is not dependent on the width of the gap if the gap is not larger than 0.2 µm and the intensity of the output signal alone is changed. Therefore, a reference sample should be polished to assume the reflectivity optically the same as that of the measuring sample and then, the width of the gap not larger than 0.2 µm is measured by the intensity of the signal.

In the conventional arrangement, since the limit of the separable width is 194 nm when the optical system using the generally available xenon lamp of the wavelength λ=350 nm is used, it is impossible to accurately measure the gap width not larger than 0.2 µm due to the limit of the diffraction of light.

SUMMARY OF THE INVENTION

The object of the present invention is therefore to provide an apparatus and a method for measuring the width of a gap not larger than 0.2 µm with high accuracy which has been impossible to measure in the conventional method using the light.

In accomplishing this and other objects, according to one aspect of the present invention, there is provided an apparatus for measuring a width of a micro gap of a non-conductive material of a sample which is formed between two conductive materials thereof, comprising: a conductive probe having a sharpened front end; a cantilever supporting the probe; a stage for use in supporting sample so as to confront the probe; a driving device for relatively moving the sample with respect to the probe in three directions of (XYZ); a bias power source for applying a voltage between the probe and the sample; an electric current detecting device for detecting a contact current running between the probe and the sample and generating signal indicative thereof; a micro displacement detecting part which detects an amount of deflection of the cantilever when the sample and the probe are in touch with each other; a servo part for feeding, to the driving deice, signals indicative of the amount of the deflection of the cantilever detected by the micro displacement detecting part and for controlling the driving device to thereby control a position of the sample in the Z-direction of the probe so as to make the amount of the deflection of the cantilever constant; and a measuring device for controlling driving device to cause the probe to scan the sample in a direction of the width of the gap of the sample, and, at the same time, sampling the signals generated by the detecting device to thereby measure the width of the gap of the sample.

According to another aspect of the present invention, there is provided a method for measuring a width of a micro gap of a non-conductive material of a sample which is formed between two conductive materials thereof, comprising steps of: mounting the sample on a stage contacting a conductive probe having a sharpened front end and supported by a cantilever with the sample confronting the probe; applying a voltage between the probe and the sample with a bias power source; detecting with a micro displacement detecting part, an amount of deflection of the cantilever when the sample and the probe are in touch with each other; feeding, from the micro displacement detecting part to a driving device via a servo part, signals indicative of the amount of the deflection of the cantilever detected by the micro displacement detecting part; thereby controlling the driving device to thereby control a position of the sample in the Z-direction of the probe so as to make the amount of the deflection of the cantilever constant; and utilizing a measuring device to control the driving device to cause the probe to scan the sample in a widthwise direction of the gap of the sample, and, at the same time, to sample signals generated by an electric current detecting device indicative of a contact current running between the probe and the sample, to thereby measure the width of the gap in the widthwise direction.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
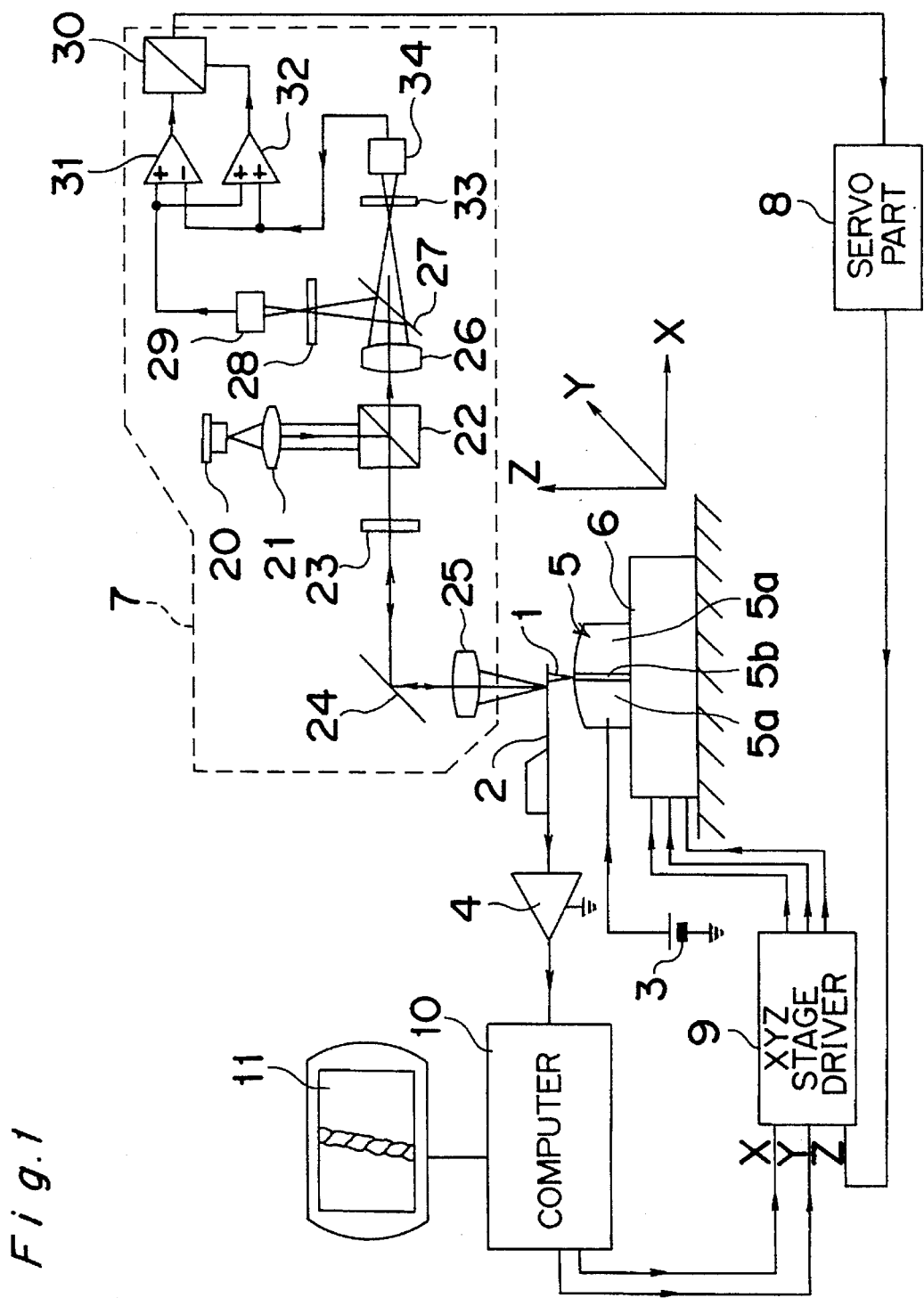
FIG. 1 is a diagram explanatory of the operating principle of a measuring apparatus for carrying out a method for measuring the width of a gap according to a first embodiment of the present invention.

Before the description of the present invention proceeds, it is to be noted that like parts are designated by like reference numerals throughout the accompanying drawing.

An apparatus and a method for measuring the width of a gap according to the present invention will be described hereinbelow with reference to the accompanying drawings.

FIG. 1 illustrates a measuring apparatus for carrying out a method of measuring the width of a gap in a first embodiment of the present invention. In FIG. 1, a conductive probe 1 is attached to a conductive cantilever 2. The conductive probe 1 has its front end sharpened to be not larger than 0.1 μm in radius. When a voltage is applied from a DC bias power source 3 between the probe 1 and a sample 5, which has a gap and is formed of two conductive materials 5a and a non-conductive material 5b, the contact current flowing between the probe 1 and the sample 5 is detected by an amplifier 4 serving as an electric current detecting device. Each conductive material 5a of the sample 5 has resistance of 5 Ωcm or less and the non-conductive material 5b has resistance $10^{11}$ Ωcm or more. The non-conductive material 5b of the sample 5 is held between the two conductive materials 5a which are electrically connected to each other. The gap measurement indicates the width of the non-conductive material 5b between the conductive materials 5a. The gap can be formed of empty space held between the conductive materials 5a, instead of the non-conductive material 5b. The sample 5 is moved on an XYZ stage 6 in three directions (XYZ). When the sample 5 is brought in touch with the probe 1, the cantilever 2 is deflected and the amount of the deflection of the cantilever 2 is detected by a micro displacement detecting part 7. At this time, a servo part 8 feeds the detected amount of the deflection of the cantilever 2 back to the XYZ stage 6 to thereby control the XYZ stage 6 and thus the position of the sample 5 with respect to the probe 1 to make the amount of the deflection constant. The XYZ stage 6 is driven by a driving device, i.e. driver 9. A computer 10 scans the XYZ stage 6 in the direction of the gap, i.e. the width of the non-conductive material between the conductive materials of the sample 5, and measures the width of the gap in the scanning direction, i.e. widthwise direction of the gap, by sampling the outputs of the amplifier 4 detecting the contact current. The measured width is displayed by a display device 11.

The measuring method of the aforementioned arrangement is executed in the manner as will be described below with reference to FIG. 1.

The amount of the deflection of the cantilever 2 is detected by the micro displacement detecting part 7 so that the amount of the deflection of the cantilever 2 of a small spring constant is maintained constant when the probe 1 is in touch with the sample 5.

When the cantilever 2 is not deflected, the light projected from a laser light source 20 through a lens 21, a polarization beam splitter 22, a quarter wavelength plate 23, a mirror 24, and a lens 25 in the detecting part 7 is focused on the rear face of the cantilever 2. The direction of polarization of the light reflected from the cantilever 2 and passed through the lens 25 and the mirror 24 is displaced 90° from the projected state by the quarter wavelength plate 23, advanced straight through the polarization beam splitter 22, and condensed by a lens 26. The light through the lens 26 is displaced again 90° by a beam splitter 27, passes through a pin hole 28 formed in front of the focal position of the lens 26 and is detected by a photodetector 29. At the same time, the condensed light from the lens 26 passes through the beam splitter 27 and a pin hole 33 in the rear of the focal position of the lens 26 to be detected by a photodetector 34. Accordingly, the change of the position of the beam spot due to the displacement of the cantilever 2 in the Z-direction is obtained by calculating the difference of the intensity of signals of the photodetectors 29 and 34 by a subtracter 31. Moreover, the displacement not larger than a submicron of the cantilever 2 is detected as the total reflection from the cantilever 2 is obtained from the sum of the intensity of signals of the photodetectors 29 and 34 calculated by an adder 32 and then the output of the subtracter 31 is divided by the sum of the adder 32 by means of a divider 30.

The output of the micro displacement detecting part 7 is sent to the servo part 8 which in turn generates and forwards a positional instruction in the Z-direction to the driver 9. AS a result, the position in the Z-direction (direction of the probe 1) of the sample 5 on the XYZ stage 6 is changed. The amount of the deflection of the cantilever 2 is thus controlled to be constant.

While the XYZ stage 6 is moved in three dimensions in the XYZ-directions by the computer 10 so as to cause scanning of the sample by the probe 1, with the force applied between the probe 1 and the sample 5 controlled to be constant, the contact current between the probe 1 and the sample 5 to which a bias voltage is impressed from the bias power source 3 is detected by the amplifier 4. By sampling the outputs of the amplifier 4, the width of the gap in the scanning direction of the sample 5 is measured by the computer 10 and displayed by the display device 11. Accordingly, the width of the minute gap is measured with high accuracy.

As described hereinabove, since the width of the gap is not measured directly with the use of the light in the first embodiment, even the width of a gap not larger than the diffraction limit of light, i.e., not larger than 0.2 μm, can be measured with high accuracy. That is, while the contact pressure between the probe having the front end sharpened to be 0.1 μm or smaller in radius and the sample is held constant, the width of the gap is measured from whether the sample is turned to conductive or not.

A second embodiment of the present invention will now be described with reference to the accompanying drawings.

Figure 2:
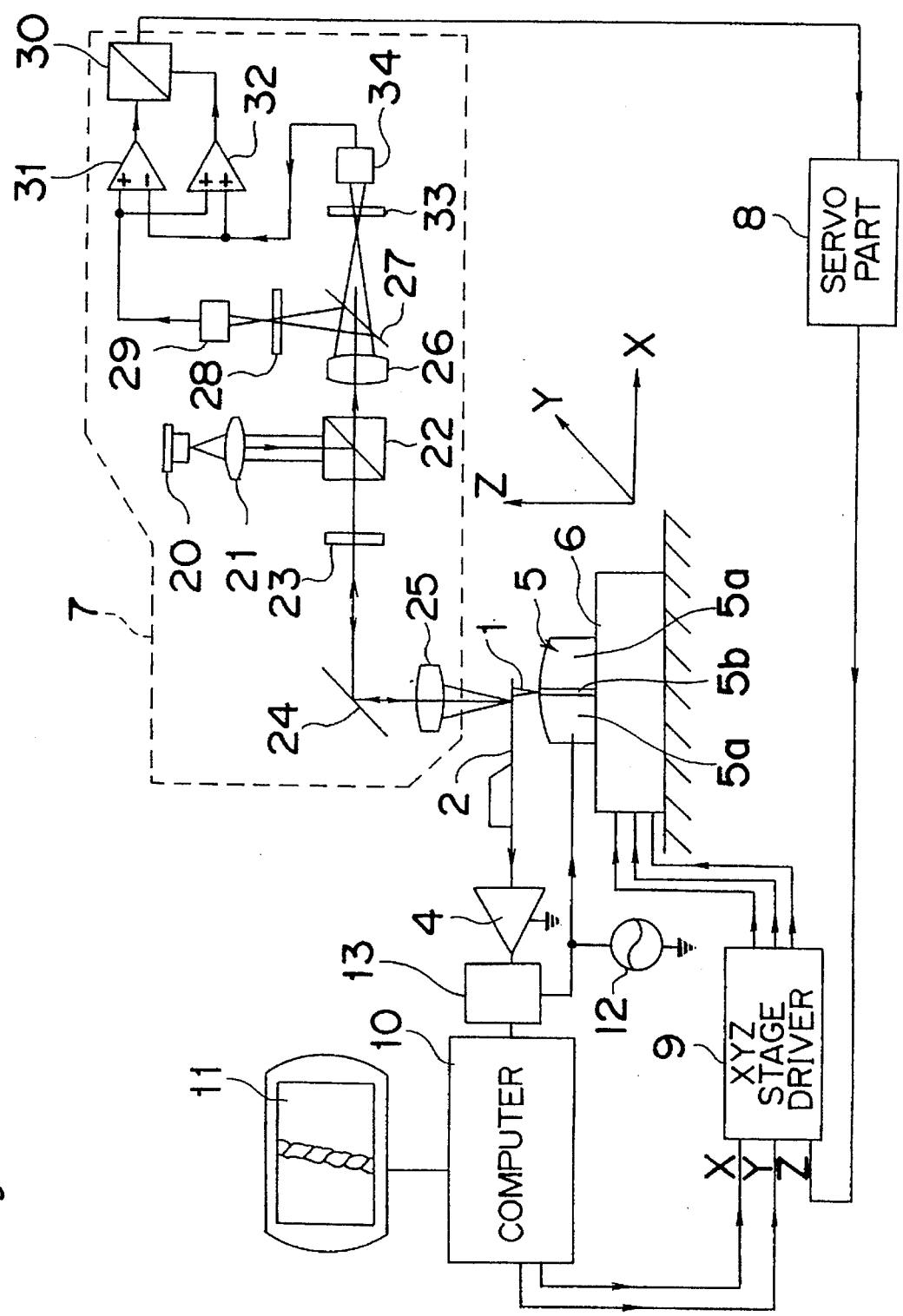
FIG. 2 is a diagram explanatory of the operating principle of a measuring apparatus for carrying out a method of measuring the width of a gap according to a second embodiment of the present invention.

FIG. 2 shows the total constitution of a measuring apparatus for carrying out a method of the width of a gap according to a second embodiment of the present invention, in which 12 and 13 represent an AC bias power source and a lock-in amplifier, respectively. The constitution except for the above AC bias power source 12 and the lock-in amplifier 13 is the same as in the first embodiment 1. According to the measuring apparatus and method of the second embodiment, the contact current between the sample 5 and the probe 1, when an alternating voltage is applied therebetween from the AC bias power source 12, is detected by the amplifier 4, and the output of the amplifier 4 is inputted to the lock-in amplifier 13 which detects only the current synchronized with the AC bias power source 12.

Although the operating principle of the measuring method in the above-described constitution is the same as that of the first embodiment, since an alternating voltage is applied between the probe 1 and the sample 5 by the AC bias power source 12, the attractive force is prevented for being continuously added between the probe 1 and the sample 5. Therefore, the mechanical bending of the probe 1 in the XY-directions is avoided. Additionally, the electric S/N ratio is improved because the contact current synchronous with the AC bias power source is detected. The width of the gap can be hence measured with higher accuracy.

Figure 3:
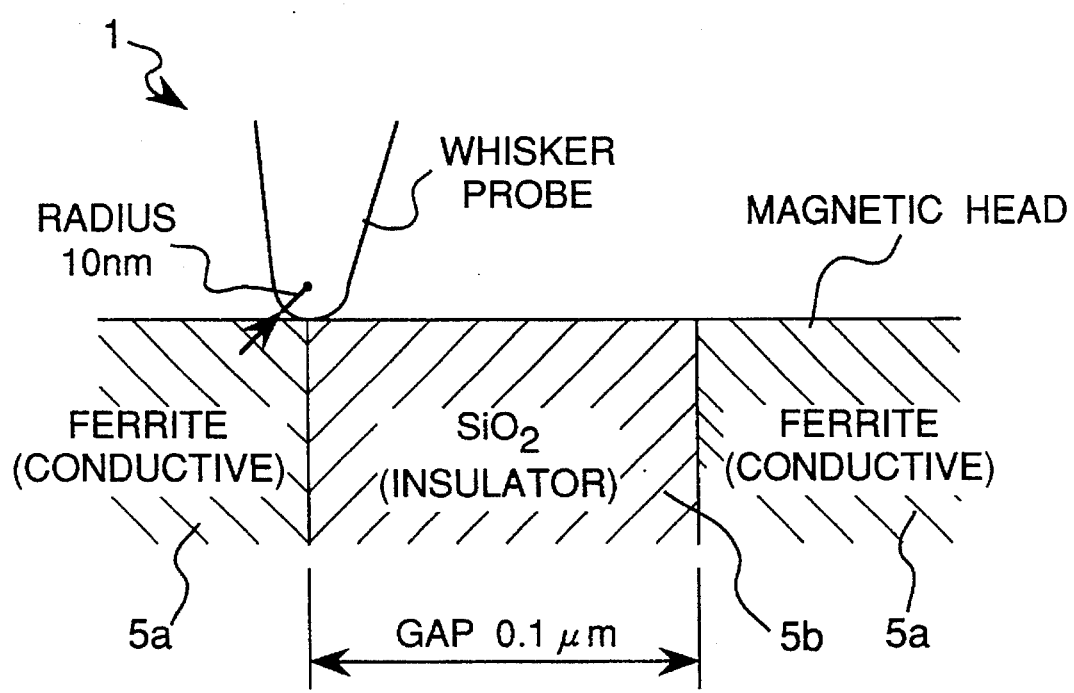
FIG. 3 is a diagram showing the structure of a probe and a sample employed in the measuring apparatus and method according to the first and second embodiments of the present invention.

FIG. 3 shows one example of the probe 1 and the sample 5 in the measuring apparatus and method according to the first and second embodiments. The whisker probe 1, made of $ZnO_2$ crystal growth and having its front end sharpened on an atomic scale, is used as shown in FIG. 3. The sample 5 has the two conductive materials 5a made of ferrite and the non-conductive material 5b made of $SiO_2$ in a magnetic head of a magnetic recording apparatus. Since the $ZnO_2$ whisker probe 1 is used and moreover, the front end of the whisker probe 1 is sharpened to not larger than 10 nm in radius, the width of the gap can be measured more accurately.

Figure 4:
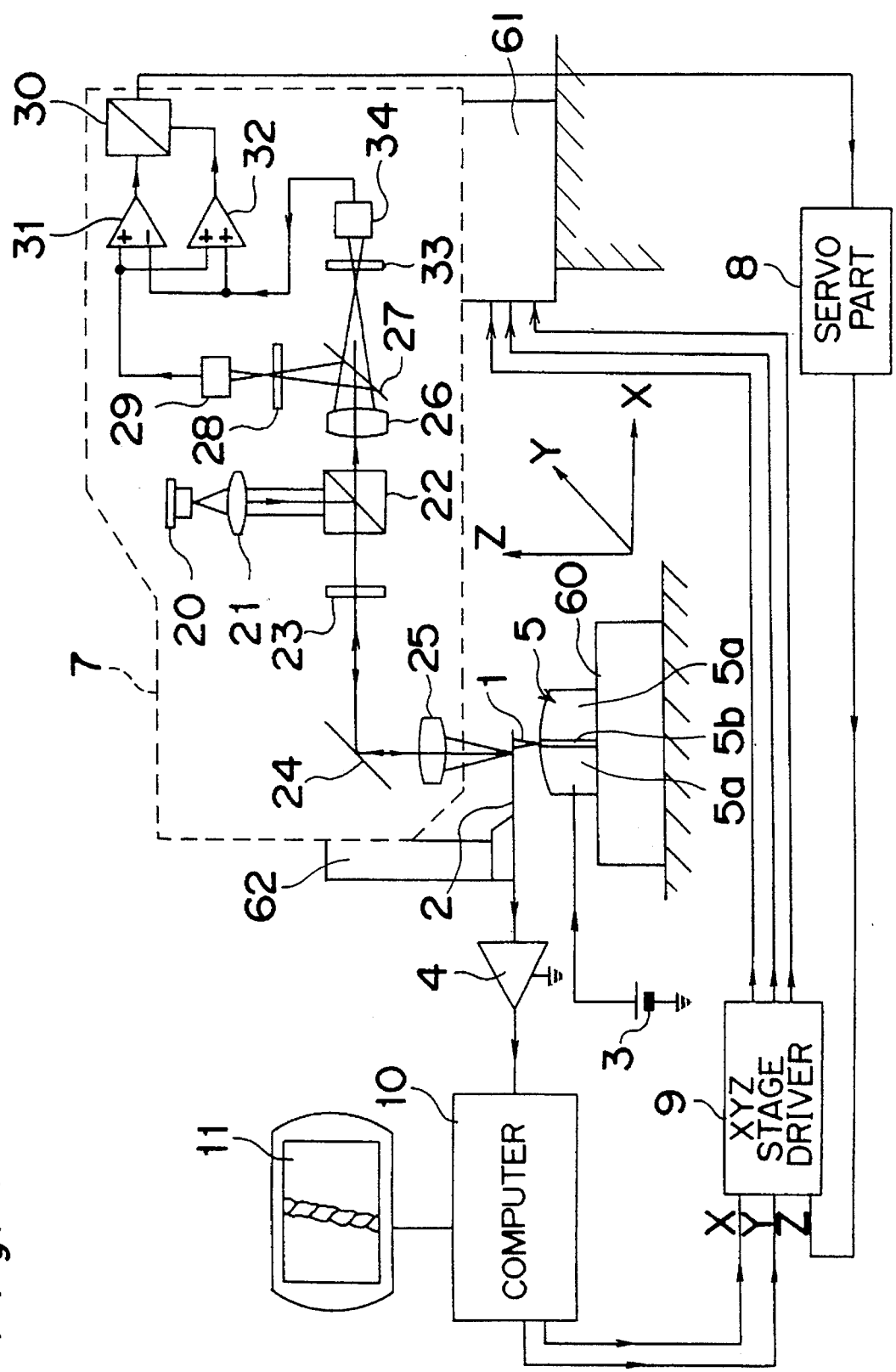
FIGS. 4 and 5 are diagrams of modifications of the first and second embodiments in FIGS. 1 and 2.
Figure 5:
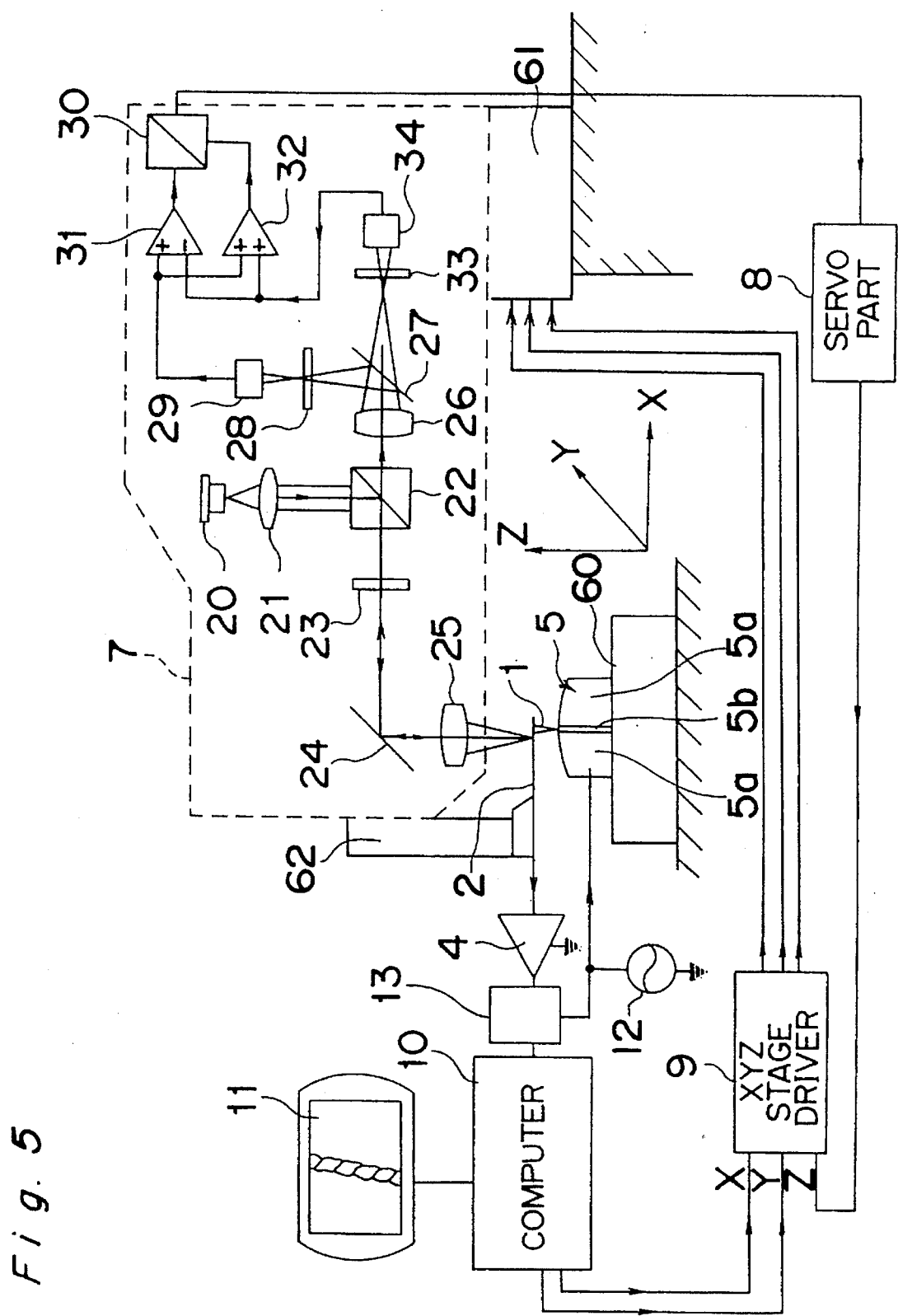
Figure 6:
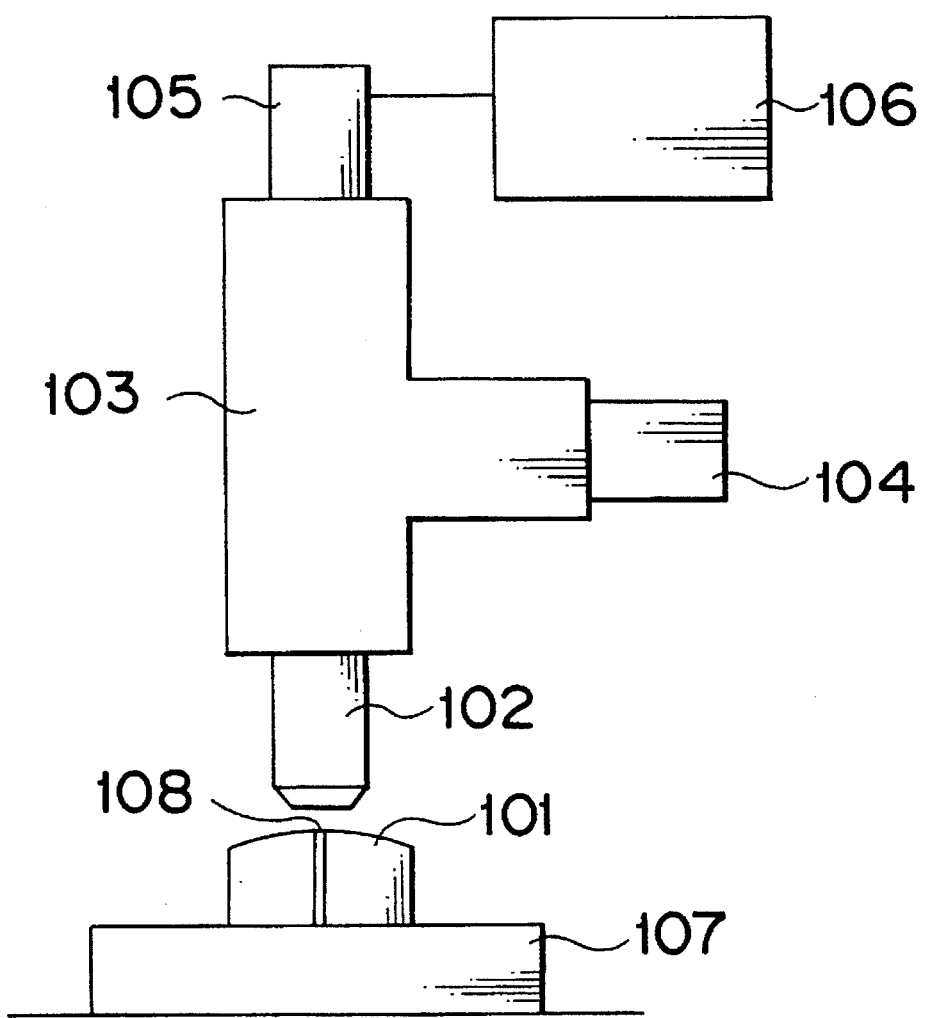
FIG. 6 is a diagram of the constitution of a conventional measuring method for measuring the width of a gap.
Figure 7:
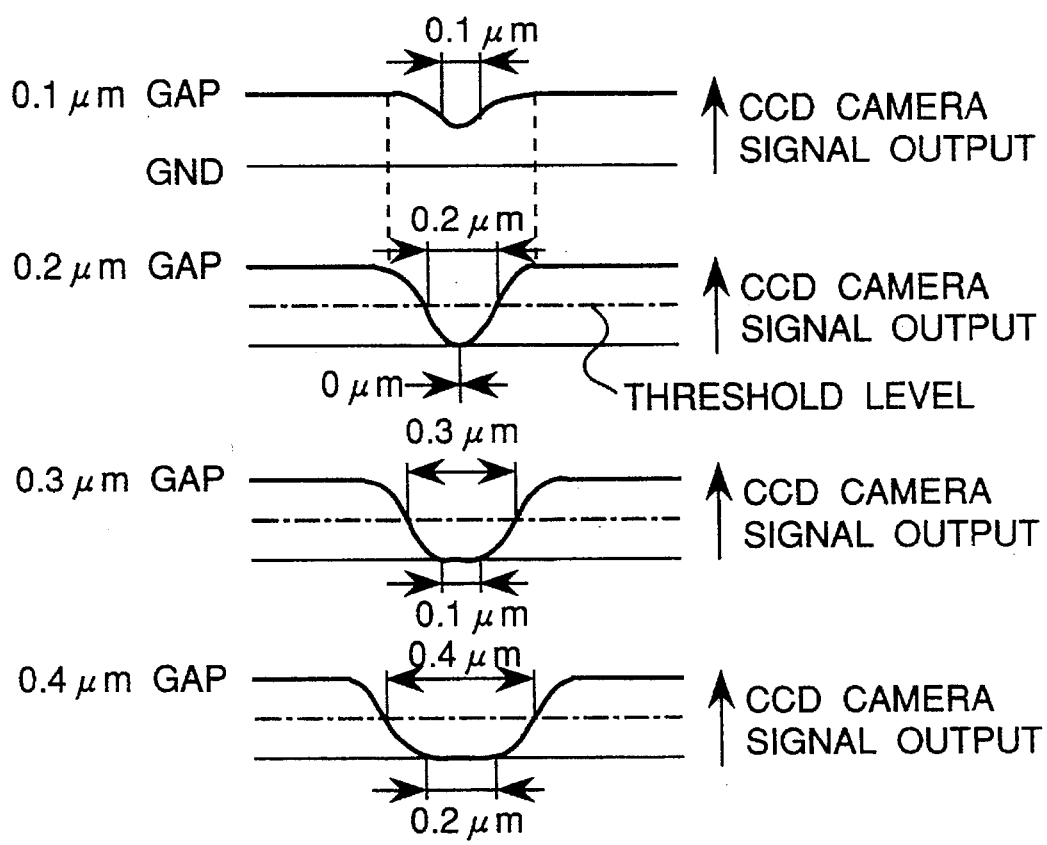
FIG. 7 is a diagram explanatory of the operating principle of the conventional measuring method.

Although in the embodiments, the sample 5 is moved for scanning by the driver 9 with respect to the probe 1, the probe 1 can be moved for scanning the sample 5 to perform the same measurement, as shown in FIGS. 4 and 5. In FIGS. 4 and 5, the sample 5 is fixed on a fixed stage 60, and the cantilever 2 having the probe 1 is connected with the micro deflection detecting part 7 via a supporting member 62 to move the cantilever 2 with the micro deflection detecting part 7 with respect to the sample 5 by an XYZ stage driver 61. Instead of the fixed stage 60, the XYZ stage 6 in FIGS. 1 or 2 can be used in FIGS. 4 and 5.

As is described above, according to the present invention, the state of the contact current between the probe and the sample subsequent to the application of a bias voltage therebetween is detected while the pressure added therebetween is kept constant, and displayed in a two-dimensional fashion, to thereby measure the width of the gap formed of the two conductive materials and the non-conductive material therebetween in the sample. Since the light is not used directly to measure the width of the gap, even a minute gap not larger than 0.2 μm, namely, not larger than the limit of the diffraction of light can be measured with high accuracy.

Moreover, when an AC power source is employed for the bias power source to detect synchronous signals with the bias power source from the outputs of the amplifier, the attractive force cannot be continuously added between the probe and the sample. In consequence, the probe is prevented from being mechanically bent and the electric S/N ratio is improved owing to the arrangement of the detection of the contact current synchronous with the bias power source, whereby the width of the gap can be measured with higher accuracy.

At the same time, when the probe is a $ZnO_2$ whisker probe the front end of which is sharpened on an atomic scale, the width of the gap can be measured with even higher accuracy.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. An apparatus for measuring a width of a micro gap of a non-conductive material of a sample which is formed between two conductive materials thereof, comprising:

a conductive probe having a sharpened front end;

a cantilever supporting said probe;

a stage for use in supporting the sample so as to confront said probe;

a driving device for relatively moving the sample with respect to said probe in X, Y and Z directions;

a bias power source for applying a voltage between said probe and the sample;

an electric current detecting device for detecting a contact current running between said probe and the sample and generating signals indicative of the contact current;

a micro displacement detecting part for detecting an amount of deflection of said cantilever when said probe is in touch with the sample;

a servo part for feeding to said driving device signals indicative of the amount of the deflection of said cantilever detected by said micro displacement detecting part and for controlling said driving device to thereby control a position of the sample in the Z-direction relative to said probe so as to make the amount of the deflection of the cantilever constant; and a measuring device for controlling said driving device to cause said probe to scan the sample in a direction across a width of the gap of the sample and, at the same time, sampling the signals generated by said detecting device, to thereby measure the width of the gap of the sample.

2. The measuring apparatus as claimed in claim 1, wherein said bias power source comprises a DC bias power source.

3. The measuring apparatus as claimed in claim 1, wherein said bias power source comprises an alternating current bias power source; and in sampling the signals generated by said detecting device, said measuring device detects signals synchronous with the alternating current bias power source.

4. The measuring apparatus as claimed in claim 1, wherein said probe is formed of $ZnO_2$ whisker.

5. The measuring apparatus as claimed in claim 2, wherein said probe is formed of $ZnO_2$ whisker.

6. The measuring apparatus as claimed in claim 1, wherein said cantilever is made of conductive material through which the voltage is applied between said probe and the sample by said bias power source.

7. The measuring apparatus as claimed in claim 1, wherein the sample is a magnetic head of a magnetic recording apparatus.

8. The measuring apparatus as claimed in claim 1, wherein the gap of the sample is not larger than 0.2 μm.

9. The measuring apparatus as claimed in claim 1, wherein
said probe is formed of $ZnO_2$ whisker, the sample is a magnetic head of a magnetic recording apparatus, and the gap of the sample is not larger than 0.2 μm.

10. The measuring apparatus as claimed in claim 2, wherein
said probe is formed of $ZnO_2$ whisker, the sample is a magnetic head of a magnetic recording apparatus, and the gap of the sample is not larger than 0.2 μm.

11. The measuring apparatus as claimed in claim 3, wherein
said probe is formed of $ZnO_2$ whisker, the sample is a magnetic head of a magnetic recording apparatus, and the gap of the sample is not larger than 0.2 μm.

12. The measuring apparatus as claimed in claim 4, wherein
said sharpened end of said probe is not larger than 10 nm in radius.

13. The measuring apparatus as claimed in claim 5, wherein
said sharpened end of said probe is not larger than 10 nm in radius.

14. The measuring apparatus as claimed in claim 9, wherein
said sharpened end of said probe is not larger than 10 nm in radius.

15. The measuring apparatus as claimed in claim 10, wherein
said sharpened end of said probe is not larger than 10 nm in radius.

16. The measuring apparatus as claimed in claim 11, wherein
said sharpened end of said probe is not larger than 10 nm in radius.

17. A method for measuring a width of a micro gap of a non-conductive material of a sample which is formed between two conductive materials thereof, comprising the steps of:

mounting the sample on a stage;

contacting the sample with a conductive probe which confronts the sample, has a sharpened front end and is supported by a cantilever;

applying a voltage between the probe and the sample from a bias power source;

detecting, with a micro displacement detecting part, an amount of deflection of the cantilever when the probe is in contact with the sample;

feeding, from the micro displacement detecting part to a driving device via a servo part, a signal indicative of the amount of the deflection of the cantilever detected by the micro displacement detecting part;

controlling the driving device to thereby control a position of the sample in the Z-direction relative to the probe so as to make the amount of the deflection of the cantilever constant; and utilizing a measuring device to control the driving device to cause the probe to scan the sample in a direction across a width of the gap of the sample and, at the same time, to sample signals generated by an electric current detecting device indicative of a contact current running between the probe and the sample, to thereby measure the width of the gap of the sample.

* * * * *